(12) United States Patent
Aguilar et al.

(10) Patent No.: US 10,041,608 B2
(45) Date of Patent: Aug. 7, 2018

(54) SWITCHING VALVE FOR THE REGULATION OF A MASS FLOW

(71) Applicant: OTTO EGELHOF GMBH & CO. KG, Fellbach (DE)

(72) Inventors: Joan Aguilar, Fellbach (DE); Rainer Maurer, Backnang (DE); Markus Nagel, Remseck (DE); Jean-Jacques Robin, Berglein (DE); Kai Schauwecker, Fellbach (DE)

(73) Assignee: OTTO EGELHOF GMBH & CO. KG, Fellbach (DE)

( * ) Notice: Subject to any disclaimer, the term of this patent is extended or adjusted under 35 U.S.C. 154(b) by 112 days.

(21) Appl. No.: 14/902,799

(22) PCT Filed: May 21, 2014

(86) PCT No.: PCT/EP2014/060455
§ 371 (c)(1),
(2) Date: Jan. 4, 2016

(87) PCT Pub. No.: WO2015/000634
PCT Pub. Date: Jan. 8, 2015

(65) Prior Publication Data
US 2016/0169407 A1 Jun. 16, 2016

(30) Foreign Application Priority Data
Jul. 4, 2013 (DE) .................. 10 2013 107 060

(51) Int. Cl.
*F16K 31/42* (2006.01)
*F16K 31/40* (2006.01)
(Continued)

(52) U.S. Cl.
CPC ......... *F16K 31/42* (2013.01); *B60H 1/00485* (2013.01); *F16K 31/408* (2013.01);
(Continued)

(58) Field of Classification Search
CPC ...... F16K 31/42; F16K 31/406; F16K 31/408; G05D 7/005; B60H 1/00485; F25B 41/062; F25B 2341/0671
See application file for complete search history.

(56) References Cited

U.S. PATENT DOCUMENTS

| | | | | |
|---|---|---|---|---|
| 3,307,823 | A | * | 3/1967 | Greer ............... F16K 31/408 251/30.03 |
| 5,048,790 | A | * | 9/1991 | Wells ............... F16K 31/408 251/30.04 |
| 7,028,713 | B2 | * | 4/2006 | Koyama ........... F16K 11/105 137/881 |

FOREIGN PATENT DOCUMENTS

| | | |
|---|---|---|
| DE | 19907732 A1 | 8/2000 |
| DE | 102004049790 A1 | 7/2005 |

(Continued)

*Primary Examiner* — Ian Paquette
(74) *Attorney, Agent, or Firm* — Kriegsman & Kriegsman

(57) ABSTRACT

Switching valve for controlling a mass flow in a cold or hot circuit. The valve includes a valve housing having a feed opening and a discharge opening; a valve piston which has a valve-closure member directed towards the discharge opening and which, in a closed position, abuts a valve seat of a through-bore between the feed opening and the discharge opening; a pilot valve having a pilot bore in the valve piston, which bore opens into the through-bore and traverses the valve piston; a path-generating device having an actuatable ram accommodating a closure member which closes the pilot bore and, with the closure member, can be moved into an opening position which opens the pilot bore; and a bypass duct formed between the feed opening and the pilot bore. At least one connection element forcibly transfers at least some of the stroke movement of the ram onto the valve piston.

10 Claims, 4 Drawing Sheets

Figure 1:
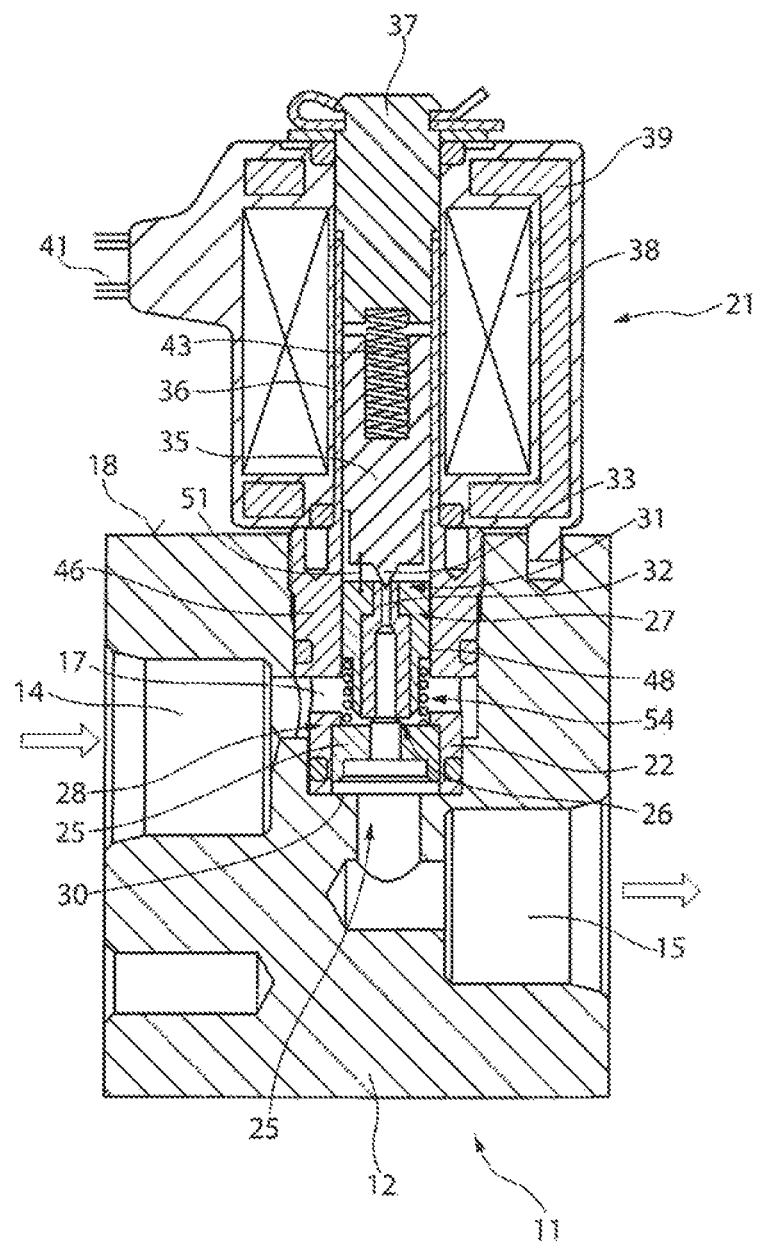

(51) Int. Cl.
*F25B 41/06* (2006.01)
*B60H 1/00* (2006.01)
*G05D 7/00* (2006.01)

(52) U.S. Cl.
CPC .......... *F25B 41/062* (2013.01); *G05D 7/005* (2013.01); *F25B 2341/0671* (2013.01)

(56) References Cited

FOREIGN PATENT DOCUMENTS

| | | |
|---|---|---|
| DE | 102007001550 A1 | 7/2008 |
| DE | 102008051172 A1 | 4/2010 |
| DE | 102009051572 A1 | 5/2011 |
| FR | 2580557 A1 | 10/1986 |

\* cited by examiner

SWITCHING VALVE FOR THE REGULATION OF A MASS FLOW

The invention relates to a switching valve for the regulation of a mass flow in an air conditioning or heating circuit.

A switching valve is known from DE 10 2004 049 790 B4, which is able to be used in, for example, cooling systems, in particular in vehicle air conditioning systems. This switching valve has a valve housing having a supply and discharge opening, as well as a through bore for a coolant connecting these. A valve piston is guided in the valve housing, said valve piston having a valve closing member pointing towards the discharge opening and adjoining a valve seat provided on the discharge opening in a closing position. A pilot hole is provided on a section of the valve piston opposite the valve closing member, said pilot hole flowing into a through bore which passes through the valve piston. The switching valve has an electromagnetic drive which actuates a ram that receives a closing member which closes the pilot hole. A bypass channel is formed between the supply opening and the pilot hole on the valve piston. With such a design of the switching valve, a servo-controlled switching valve or a so-called servo valve can be formed. Such a servo valve requires a positive pressure difference between the inlet opening and the outlet opening before the switching process in order to be able to switch. In order to reduce this minimum pressure difference, a so-called pilot spring can additionally be used, which lifts the closing body in the pilot hole as soon as the ram has been lifted for the electromagnetic drive. The power of such a switching valve required for switching is equal to the product of the MOPD (Maximum Open Pressure Difference) value and the surface of the pilot seat that is effectively to be sealed.

Furthermore, a switching valve having an electromagnetic drive is known from DE 10 2009 051 572 A1.

The requirements for such switching valves are increasing. This is particularly the case in the context of hitherto existing motor vehicles that have been operated exclusively with internal combustion engines in which the heat losses of the engine were used as heat energy. In vehicles that are now completely electrically operated, the heat energy must be provided by accumulators in addition to driving energy. In order to reduce losses in range by the vehicle air conditioning, one passenger compartment may be heated and dehumidified by an air conditioning system that is operated as a heating pump. For switching the air conditioning system between hot and cold operation, switching valves are required which fulfil particularly stringent requirements. Securing for opening the switching valve after the control thereof is also part of this.

The object of the invention is therefore to propose a switching valve in which a secure opening and, preferably, a detection, of the opening process is enabled in a simple manner without sensors.

This object is solved according to the invention by a first embodiment of a switching valve in which at least one connection element is provided between the rams of the pressure generation device and the valve piston, said connection element forcibly transferring at least one part of a travel path of the ram to the valve piston, such that this is lifted from the valve seat. Due to such a coupling of the ram with the valve piston, it is ensured that not only is a passage of the coolant between the inlet and outlet opening enabled by a pilot hole, but also the complete opening cross section of the discharge opening is provided for the flow of the coolant. Due to such a forcible movement coupling of the ram with the valve piston, a secure switching of the valve piston can be enabled without a servo function or the MODP values of the switching valve being impaired. Moreover, this arrangement, together with a monitoring of the power consumption of a coil of the path generation device, enables a loadable positional recognition of the valve piston, such that the switching valve is able to emit a return signal to a regulation system of the cooling or heating pump system. Such an arrangement is, above all, then advantageous if the switching valve is installed, for example, directly behind a refrigerant compressor on the hot gas side.

The connection element is preferably formed as a member which only transfers a tensile force. This has the advantage that the connection element is only active in one movement direction for the forcible movement of the valve piston. For an NC (normally closed) valve, the connection element acts in such a way that, during a lifting movement of the rain, firstly the pilot hole is released without being influenced by the connection element, and then the valve piston is forcibly lifted at least partially from the valve seat by the connection element, such that the switching valve is transferred into an opening position.

The connection element is preferably formed or arranged between the ram and valve piston in such a way that the valve piston is lifted from the pilot hole with temporal offset to the lifting of the closing body. A provided opening movement of the valve piston therefore firstly remains uninfluenced by the connection element. As long as the opening movement of the valve piston takes place in the manner provided, the connection element does not come into use. Should, however, a lifting of the valve piston not take place, the lifting movement is initiated by the connection element.

According to a preferred embodiment, the connection element is formed as a cable, a wire or as a tension rod. Depending on the construction space available and the medium, as well as the constructive structure of the ram and the valve piston, a corresponding connection element can be selected.

An alternative embodiment of the connection element provides that this is formed as a tie rod which is fastened to the ram, in particular to the closing body of the ram, and extends through the pilot hole of a pilot valve. A central implementation of the connection element by the pilot hole can thereby take place, such that a tilt-free and forcible lifting of the valve piston from the valve seat can be initiated.

The connection element formed as a tie rod preferably has a bar element which is able to be fastened to a profile or a bulge opposite in a simple manner in the ram, in particular the closing body. For example, a press connection or a non-releasable latch and/or snap connection or similar may be provided.

One preferred embodiment of the invention provides that the path generation device of the switching valve is formed as a monostable solenoid, i.e. during the feeding of a coil of the solenoid with current, the ram is driven in one direction and, when the current feed is switched off, the ram is guided back into its starting position as a result of an elastic force of a return spring adjoining the ram. Alternatively, the path generation device may have a bistable solenoid. This means that the ram controlled by the solenoid remains in position in two final positions in a self-retaining manner. The use of such bistable solenoid actuators is advantageous in particular for automobile heating pump systems. The energy consumption in electric vehicles can thereby be further minimised, since the coil of the solenoids only has to be fed with current during the switching process—so for only a few fractions of a second.

Particularly during the use of the switching valve for heating pump circuits, it is necessary for the switching valve to be able to implement a switching of high volume flows both on the high-pressure side and on the low-pressure side of an air conditioning system or a heating pump circuit. According to the invention, a further embodiment of a switching valve is therefore provided, in which the valve piston has a first guide section in the region of the pilot hole, said guide section adjoining a wall section of a chamber between the supply and discharge opening, and having a second guide section opposite this in the region of the discharge opening. It is thus ensured that, due to the impulse transfer of the volume flow acting on the valve piston, a secure guiding and opening, as well as a closing, movement of the valve piston, is provided. The at least twofold guiding of the valve piston in the valve housing also enables a compact arrangement which simultaneously generates low decreases in pressure. This is above all particularly advantageous when using the switching valve on a suction side of a heating pump system.

Furthermore, the second guide section is preferably formed by an end region of the pilot hole in the valve piston, said end region guiding the discharge opening. A simple and construction space-saving arrangement can thereby be created.

Moreover, the first guide section which is preferably arranged on the valve piston has a wiper ring which adjoins the wall section of the chamber or of an anchor tube of the path generation device between the supply opening and the discharge opening. A tolerance compensation can thereby be created in order to avoid canting or tension during different switching states between the valve piston and the valve housing.

Furthermore, a bypass or bypass channel is preferably formed between a wall section of the chamber, said chamber being arranged between the supply opening and the discharge opening, and the first guide section. The pilot valve can be controlled in this way, wherein, at the same time, an advantageous embodiment for guiding the valve piston in the chamber is enabled. The wiper ring provided in the guide section does not completely seal the valve piston to the wall section of the chamber, since this has a groove or similar in the peripheral direction, such that a leakage current between the spaces below and above the wiper ring can be formed, which is necessary for the servo function when switching the valve.

Figure 2:
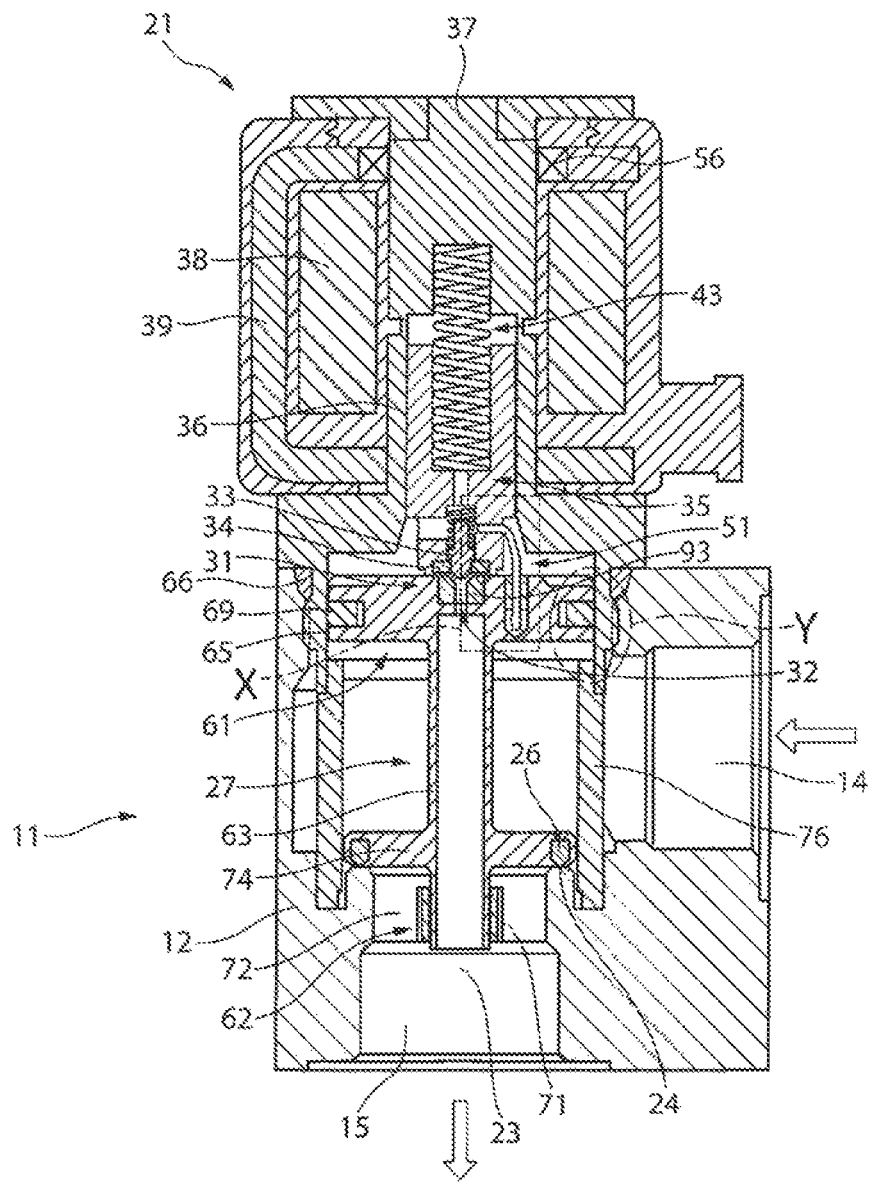
Figure 3:
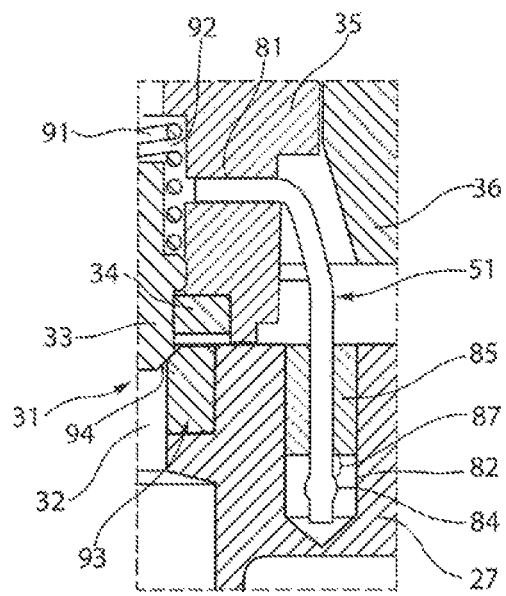
Figure 4:
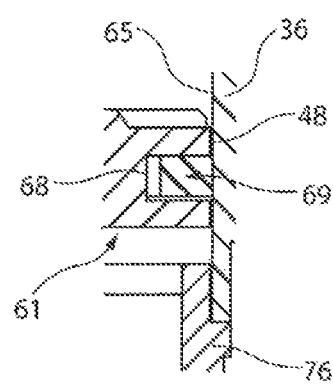
Figure 5:
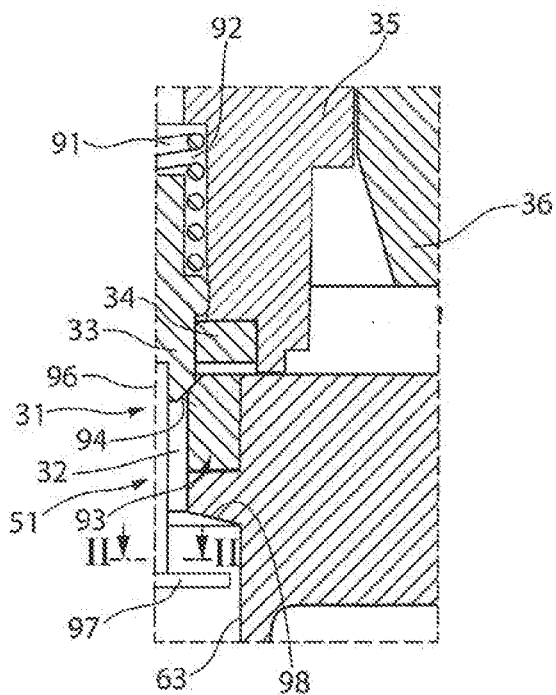
Figure 6:
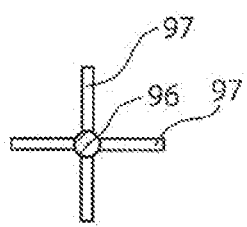

The invention and further advantageous embodiments and developments of the same are described and illustrated below with the aid of the examples depicted in the drawings. The features to be gleaned from the description and drawings may be applied individually in of themselves or as a multiplicity in any combination according to the invention. Shown are:

FIG. 1 a schematic sectional depiction of a first embodiment of the switching valve according to the invention, FIG. 2 a schematic sectional depiction of a further alternative embodiment of the switching valve, FIG. 3 a schematically enlarged sectional view of detail "X" of the switching valve according to FIG. 2, FIG. 4 a schematically enlarged sectional view of detail "Y" of the switching valve according to FIG. 2, FIG. 5 a schematically enlarged sectional view of an alternative embodiment of detail "X" of the switching valve according to FIG. 2, and FIG. 6 a schematic sectional view along the line II-II in FIG. 5.

A schematic sectional view of a first embodiment of a switching valve 11 according to the invention is depicted in FIG. 1. This switching valve 11 comprises a valve housing 12 having a supply opening 14 for a mass flow, in particular a coolant, as well as a discharge opening 15 and a chamber 17 connecting the supply opening 14 and the discharge opening 15, or a coolant channel. The supply opening 14 and discharge opening 15 each have connections for supply lines or further components.

The chamber 17 in the valve housing 12 is designed to open out towards a housing side 18, on which a path generation device 21 is releasably fastened. According to the exemplary embodiment in FIG. 1, the chamber 17 receives a panel 22 which is able to be inserted into the chamber 17. A throttle cross section or a flow cross section of the mass flow between the supply opening 14 and the outlet opening 15 is thereby able to be selected or limited. The panel 22 has a through bore 23 which is enclosed by a valve seat 24, which is adjoined by a valve closing member 25 of a valve piston 27 in a closing position 28. Alternatively to the arrangement of a panel 22 in the chamber 17, the valve seat 24 can be provided directly on the base 30 of the chamber 17, out of which the through bore 23 extends from the front.

The valve piston 27 has, on its end opposite the valve closing member 26, a pilot hole 32 which is able to be closed with a closing body 33. The pilot hole 32 and the closing body 33 form a pilot valve 31. This closing body 33 is arranged fixedly on a ram 35, said ram being able to be moved up and down and back and forth by the path generation device 21. Alternatively, the closing body 33 may also be provided on the ram 35 according to the embodiment in FIG. 2.

The path generation device 21 comprises, according to this exemplary embodiment, an anchor tube 36, to which a core 37 is allocated. A coil 38 encloses the anchor tube 36, which is in turn integrated into a yoke 39. The path generation device is able to be controlled and held by electrical connection lines 41.

The ram 35 is mounted moveably relative to the anchor tube 36 with interconnection of a return spring 43 to the core 37, i.e., during the current feeding of the coil 38, the ram 35 is drawn into the anchor tube 36 contrary to the elastic force of the return spring 43 and, when the coil 38 is switched off, the return spring 34 transfers the ram 35 in a closing movement and arranges the ram 35 in a closing position, as is depicted in FIG. 1. Here, the closing body 33 engages with the pilot hole 32 of the valve piston 27. The valve closing member 36 closes the through bore 23 and adjoins the valve seat 24. The valve piston 27 is preferably guided in a guide bush 46 that is able to be inserted into the valve housing 12. Alternatively, the valve piston 27 may also be guided directly on a wall section of the chamber 17 that opens out towards a housing side 18. A bypass channel 48 is provided between this wall section of the guide bush 46 or the chamber 17 and the valve piston 27, whereby a connection between the supply opening 14 and the pilot valve 31 is created. After lifting the closing body 33 from the pilot hole 32, the mass flow is able to flow through the pilot hole 32 into the through bore 23, since the pilot hole 32 extends completely through the valve piston 27 up to the valve closing member 26.

The valve 11 depicted in FIG. 1 is a so-called NC (normally closed) valve, i.e. when the coil 38 does not have a current fed to it, the valve 11 is closed and closes a passage between the supply and discharge opening 14, 15. With such a valve 11, a monostable path generation device 21 is, for example, used, which holds only one position of the ram 35 so long as the coil 38 is fed with current.

The valve 11 depicted in FIG. 1 is a servo-controlled valve 11, wherein the ram 35, in particular with the closing body 33, forms the servo or pilot valve 31. This valve 11 serves for regulation, in particular switching off a mass flow.

A connection element 51 is provided between the ram 35 and the valve piston 27. This connection element 51 is, for example, formed as a cable, wire, tension rod or similar and then transfers a tensile force onto the valve piston 27 as soon as the ram 35 has been lifted from the valve piston 27—so the pilot hole 32—by the path generation device 21. Provision is therefore made for the first lifting movement of the closing body 33 to take place from a closing position to the pilot hole 32, without influence by the connection element 51, or for a tensile force not to be exerted by the connection element 51 from the ram 35 onto the valve piston 27. It is only after a predetermined lift, for example the complete lifting of the closing body 33 from the pilot hole 32, or later, that a forcible lifting movement of the valve piston 27 is initiated by the connection element 51. The lifting movement of the ram 35 is transferred by the connection element 51 onto the valve piston 27, such that this is forcibly lifted from the valve seat 24 of the through bore 23, as long as this is itself not lifted by the ram 35 after the opening of the pilot hole 32. It can thus be ensured that the valve 11 is opened securely after its activation by the path generation device 21.

The opening movement of the valve piston 27 from the valve seat 24 may be supported by a spring element 54 as an opening spring. This spring element 54 engages between the panel 22 or a base 30 of the chamber 17 and a collar formed on the valve piston 27.

An alternative embodiment of a switching valve 11 to FIG. 1 is depicted in FIG. 2. In this embodiment, instead of a monostable, electromagnetic drive according to FIG. 1, a path generation device 21 having a bistable solenoid actuator is used. This means that the ram 35 that is able to move in an anchor tube 36 is arranged in two end positions in a self-retaining manner. This solenoid actuator comprises an anchor tube 36, in which the ram 35 is guided. In the exemplary embodiment, this anchor tube 36 passes over into the core 37, which is in turn enclosed by a coil 38. Alternatively to this single-part embodiment, a dual-part embodiment as in FIG. 1, or a multi-part embodiment, may also be provided. The yoke 39 is arranged outside the coil 38, wherein a permanent magnet 56 is provided in an end section of the core 37 located opposite the ram 35, said permanent magnet enclosing the core 37. Therefore, after the preferably brief feeding of the coil 38 with a current, the ram 35 is drawn into the anchor tube 36 and a lifting movement for lifting the closing body 33 arranged thereon from the pilot hole 32 is enabled. After the coil 38 is switched off, the ram 35 is held in this end position by the permanent magnet 56. To close the pilot hole 32, the coil 38 is fed with reverse polarity, such that the ram 35 is driven with a lifting movement for being driven out of the anchor tube 36, in order to then be transferred into a closing position of the closing body 33 relative to the pilot hole 32 and therefore of the valve closing member 26 relative to the valve seat 24.

This embodiment according to FIG. 2 furthermore differs in terms of the practical configuration of the valve piston 27 from the embodiment according to FIG. 1, wherein the function is the same. In this embodiment, the connection or blocking of large cross sections or volume flows is in particular enabled. Moreover, a greater lifting of the valve piston 27 can be achieved by such an embodiment. The valve piston 27 comprises a first guide section 61 and a second guide section 62, which are spaced apart from each other. A tube section 63 is provided between the two guide sections 61, 62, said tube section being part of the pilot hole 32 and in turn completely passing through the valve piston 27. The first guide section 61 adjoins a wall section 65 of a chamber 17 or—as depicted in the exemplary embodiment—the wall section 65 which is formed in a lower end section of the anchor tube 36, with which the path generation device 21 is preferably fixed to the valve housing 12. If the anchor tube 36 is fastened directly to the valve housing 12 and partially engages with this, a seal is provided therebetween, for example by a sealing element 66. The guide section 61 adjoins the wall section 65 with its radial shell surface, wherein the arrangement is provided with tolerances. The bypass channel 48 between the supply opening and the closing body 33 can thereby be formed. The guide section 61 has, as depicted in greater detail by the detail "Y" in FIG. 4, a U-shaped, radially peripheral depression 68, into which a wiper element 69 is inserted. This wiper element 69 serves to compensate for positional and shape tolerances between the anchor tube 36. At the same time, the wiper element 69, which may have at least one groove on the outer periphery, enables a leakage current from the inlet opening 14 to be able to arrive at the pilot valve 31.

The second guide section 62 is provided opposite the first guide section 61, as emerges from FIG. 2. The second guide section 62 engages with a guide sleeve 71, which is, for example, fastened in the through bore 23 by bars 72, such that the guide sleeve 71 is securely received by a star-shaped arrangement of the bars 72, for example.

Due to the supply and discharge openings 14, 15 that are designed with a greater diameter compared to the switching valve 11 according to FIG. 1, the valve body 27 comprises a plate-shaped section 74 on or into which the valve closing member 26 is arranged or able to be inserted for contact on the valve seat 24. A flat seat valve, for example, is thus formed.

In this embodiment, one potential use of a screen 76 is furthermore depicted, which is able to be inserted into the chamber 17 and, for example, is positioned and fixed by means of the anchor tube 36 of the path generation element 21. In the exemplary embodiment according to FIG. 1, the screen 76 can, for example, be fixed by the guide bush 46.

The connection element 51 arranged between the ram 35 and the valve piston 27 is depicted in FIG. 3 with schematic enlargement according to the detail "X". For example, a traction cable, a wire or similar is anchored fixedly in a bore hole 81 in the ram 35. This can, for example, take place by adhesion, pressing or similar. The opposite end of the connection element 51 is provided in a bore hole or blind hole 82 in the valve piston 27. The lower end of the connection element 51 has a bulge 84, wherein the connection element 52 is guided displaceably in the guide element 85. The guide element 85 is inserted into the bore hole 82 after the introduction of the connection element 51 into a through bore of the guide element 85 and, for example, connected tightly by pressing, adhesion, welding or similar. The free route 87 between the front side of the guide element 85 and the bulge 84 determines the free lifting path of the ram 35 for lifting relative to the pilot hole 32, before the valve piston 27 is forcibly moved upwards by the ram 35, since the bulge 84 adjoins the guide element 85 and thus a forcible lifting movement of the valve piston 27 is controlled.

In the embodiment according to FIG. 3, the connection element 51 may be formed as a cable, traction cable or similar. It can, however, also be a preformed wire element which is introduced in the depicted geometry. The connection element 51 may also be a tension rod or similar.

It is furthermore depicted with enlargement in FIG. 3 that the closing body 33 of the pilot valve 31 is able to be received in a spring-mounted manner by a spring element 91, alternatively to the embodiment, according to FIG. 1, arranged on the ram 35. The closing body 33 is preferably guided in a guide 34 that is formed, for example, as a disc. The closing body 33 can therefore be immersed into a receiving space 32 provided in the ram 35 and a smooth closing of the pilot hole 32 can be achieved.

The pilot hole 32 is, for example, provided in an insertable valve seat element 93, on which a valve seat 94 is formed. Alternatively, the closing body 33 may also directly adjoin a valve seat 94 formed on the valve piston 27. The use of an insert for the formation of the valve seat 94 as a sealing piece has the advantage that both an increased level of impermeability and a noise reduction are provided during a switching process.

An alternative embodiment of the detail "X" according to FIG. 2 is depicted in FIG. 5. FIG. 6 shows a schematic sectional view along the line II-II in FIG. 5. In this embodiment, the connection element 51 is formed by a tie rod which is fastened onto the closing body 33. The tie rod comprises a bar element or pin 96 which is fastened with one end to the closing body 33, in particular a bore hole, and which extends through the pilot hole 32 of the valve piston 27. A star or cross-shaped profile 97, a bulge 84 or similar is provided on the end thereof, the radial extension of which is in any case greater than the diameter of the pilot hole 32 which is formed by the valve element 93. A connection element 51 that is centrally arranged on the ram 35, in particular the closing body 33, can thereby be provided, which enables a forcible lifting of the valve piston 27, since the star or cross-shaped profile 97 or a bulge 84 adjoins and engages with the collar 98 adjoining the pilot hole 32, in order to effect a lifting of the valve piston 27. The collar 98 passes over into the tube section 63, which separates the second guide section 61, 62.

FIG. 6 shows, by way of example, a cross-shaped profile 97 of the connection element 51. Alternatively, this may also be provided as being star-shaped or disc-shaped.

All aforementioned features are each essential to the invention in of themselves and may be combined with one another in any manner.

The invention claimed is:

1. Switching valve for the regulation of a mass flow in an air conditioning or heating circuit, having a valve housing which has a supply opening and a discharge opening, having a valve piston which has a valve closing member pointing towards the discharge opening and, in a closing position, adjoins a valve seat arranged on a through bore between the supply opening and the discharge opening, having a pilot valve opposite the valve closing member, said pilot valve having a pilot hole in the valve piston, said pilot hole flowing into the through bore and passing through the valve piston, having a path generation device which has an actuatable ram which receives a closing body that closes the pilot hole and is able to be transferred with the closing body into an opening position that releases the pilot hole, and having a bypass channel formed between the supply opening and the pilot hole, wherein at least one connection element is provided between the ram and the valve piston, said connection element transferring at least one part of a lifting movement of the ram forcibly onto the valve piston, and wherein said connection element is formed as a tie rod which is fastened onto the ram or the closing body and extends through the pilot hole.

2. Switching valve according to claim 1, wherein the connection element is formed as a member that only transfers a tensile force.

3. Switching valve according to claim 1, wherein the connection element controls a lifting of the valve piston out of the valve seat of the through bore with temporal offset after the lifting of the closing body from the pilot hole.

4. Switching valve according to claim 1, wherein the connection element has a bar element on whose end being guided through the pilot hole a star-shaped or cross-shaped profile or a connection is provided.

5. Switching valve according to claim 1, wherein the path generation device is formed as a monostable or bistable solenoid actuator.

6. Switching valve according to claim 1, wherein the valve piston comprises a first guide section in the region of the pilot hole and a second guide section opposite and spaced apart from the first guide section.

7. Switching valve according to claim 6, wherein the second guide section is formed by an end region of the pilot hole in the valve piston, said end region leading into the discharge opening.

8. Switching valve according to claim 6, wherein the first guide section receives a wiper element which adjoins a wall section of a chamber or of an anchor tube between the supply opening and the discharge opening.

9. Switching valve according to claim 6, wherein the bypass or bypass channel is formed between the first guide section and a wall section of a chamber or an anchor tube.

10. Switching valve according to claim 6, wherein the closing body is arranged immersibly or in a spring-mounted manner opposite the ram or immersibly and in a spring-mounted manner opposite the ram.

* * * * *